United States Patent
Schwanitz

(10) Patent No.: US 9,617,063 B2
(45) Date of Patent: Apr. 11, 2017

(54) DISCHARGE DEVICE FOR A HOLDING BIN

(71) Applicant: Mettler-Toledo Garvens GmbH, Giesen (DE)

(72) Inventor: Florian Schwanitz, Eime (DE)

(73) Assignee: Mettler-Toledo Garvens GmbH, Giesen (DE)

(*) Notice: Subject to any disclaimer, the term of this patent is extended or adjusted under 35 U.S.C. 154(b) by 34 days.

(21) Appl. No.: 14/704,546

(22) Filed: May 5, 2015

(65) Prior Publication Data

US 2015/0321825 A1 Nov. 12, 2015

(30) Foreign Application Priority Data

May 7, 2014 (EP) .................................... 14167418

(51) Int. Cl.

| | | |
|---|---|---|
| *B65D 83/00* | (2006.01) | |
| *G01G 15/00* | (2006.01) | |
| *B07B 13/16* | (2006.01) | |
| *G01G 23/00* | (2006.01) | |

(52) U.S. Cl.
CPC .............. *B65D 83/00* (2013.01); *B07B 13/16* (2013.01); *G01G 15/00* (2013.01); *G01G 23/00* (2013.01)

(58) Field of Classification Search
CPC ........ B65D 83/00; B07B 13/16; G01G 23/00; G01G 15/00; B65G 1/006; B65G 1/12; A47G 29/14
USPC ............ 232/43.1; 220/908; 221/152; 177/50
See application file for complete search history.

(56) References Cited

U.S. PATENT DOCUMENTS

| 814,563 A | 3/1906 | Pond | |
|---|---|---|---|
| 3,109,586 A * | 11/1963 | Kohn | A47G 29/06 232/43.1 |
| 3,263,854 A * | 8/1966 | Powers | B65F 1/1426 220/476 |
| 5,192,121 A * | 3/1993 | Stutler | B65F 1/006 220/909 |
| 5,361,978 A | 11/1994 | Monroe | |
| 5,381,921 A * | 1/1995 | Bray | B65F 1/06 220/495.08 |
| 5,984,134 A * | 11/1999 | Mario | B65F 1/06 220/495.11 |
| 6,202,922 B1 | 3/2001 | Phillips et al. | |

(Continued)

FOREIGN PATENT DOCUMENTS

| DE | 3333316 A1 | 3/1985 |
|---|---|---|
| DE | 102004032052 A1 | 1/2006 |

*Primary Examiner* — William Miller
(74) *Attorney, Agent, or Firm* — Standley Law Group LLP

(57) ABSTRACT

A bin (101, 201, 301) that holds articles sorted out by a sorter has an inlet opening (102, 202, 302) for delivering the articles to an interior of the bin and a discharge device (103, 203, 303) for removing the articles therefrom, the discharge device being normally arranged below the inlet opening. The discharge device has a flap (104, 204, 304), pivotally supported for rotation about an axis (105, 205, 305), as well as two sidewalls (106, 206, 306), attached laterally to the flap. The bin includes a motion-guiding arrangement in which a guide track (107, 207, 307) and a pin (108, 208, 308) are arranged for complementary engagement in an operating state of the bin. Either the pin or the guide track is arranged on one of the sidewalls, with the other part arranged on a side of the bin.

17 Claims, 5 Drawing Sheets

(56) References Cited

U.S. PATENT DOCUMENTS

| | | | |
|---|---|---|---|
| 8,668,107 B2* | 3/2014 | Decker | B65F 1/006 |
| | | | 220/500 |
| 2004/0084356 A1 | 5/2004 | Cavatorta | |
| 2006/0261143 A1* | 11/2006 | Sola Barbarin | B65F 1/06 |
| | | | 232/43.1 |

* cited by examiner

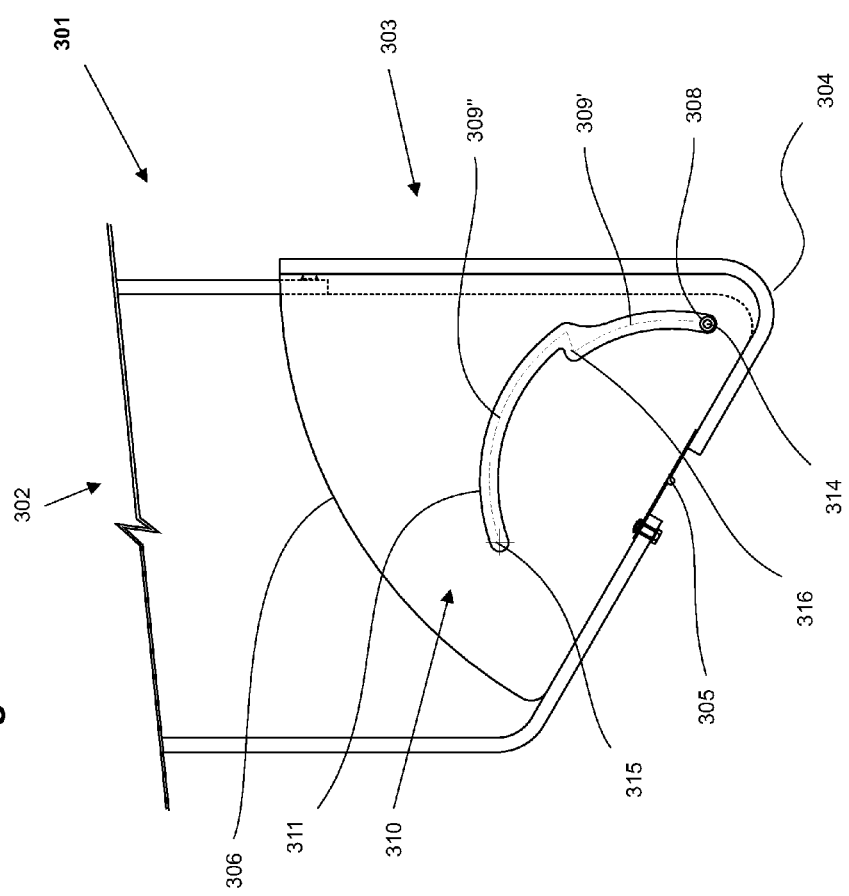
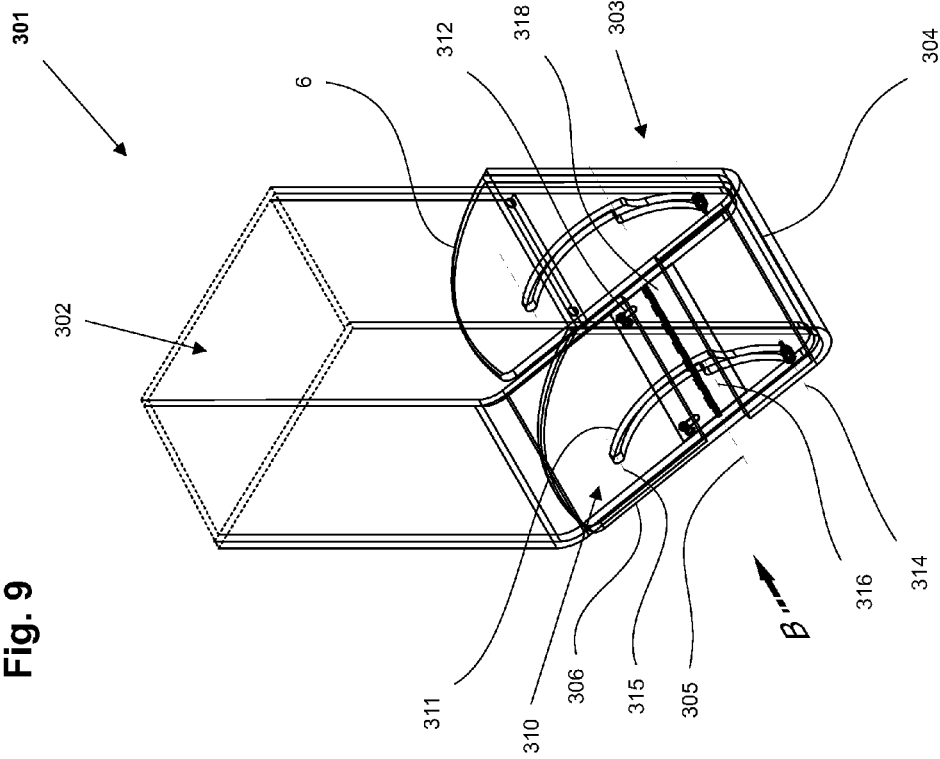

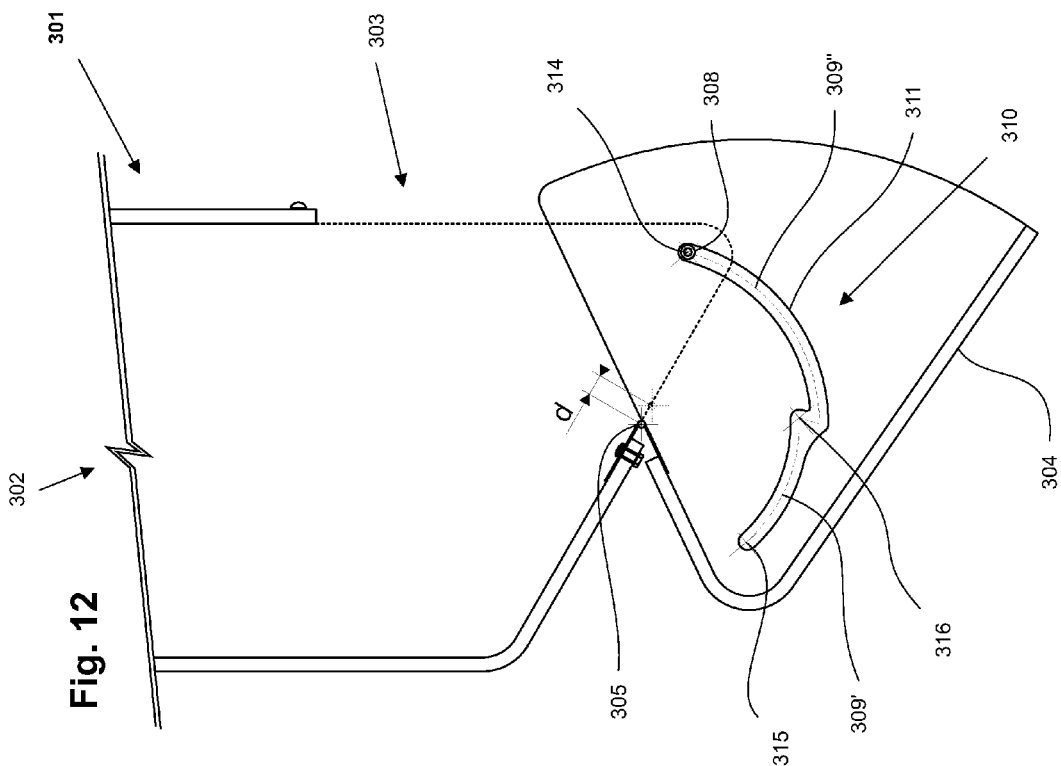
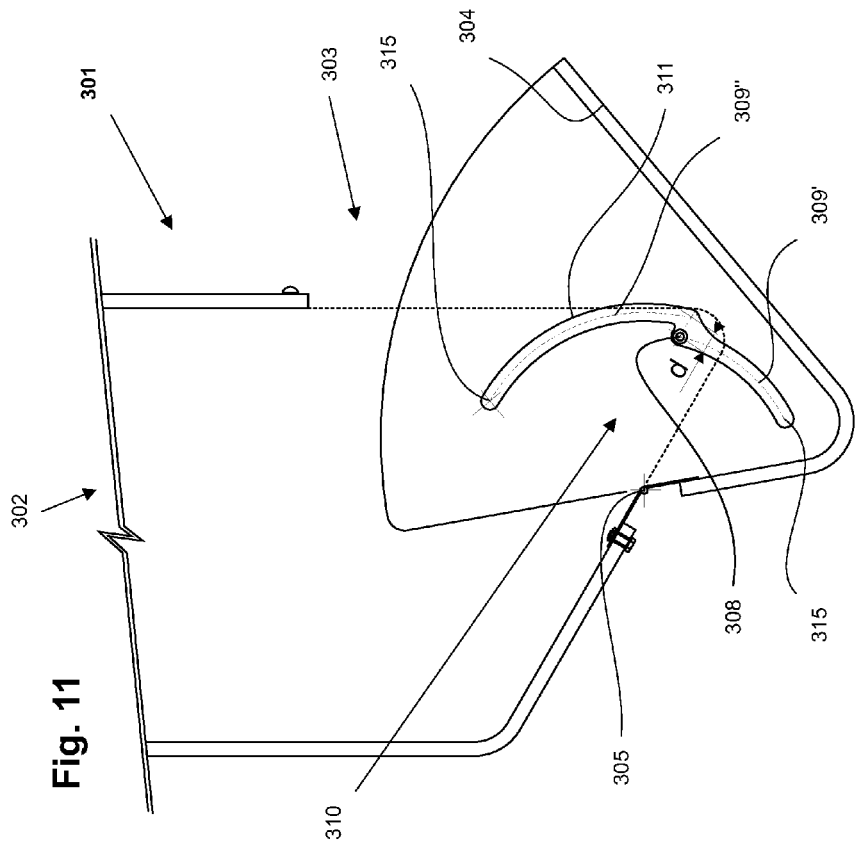

DISCHARGE DEVICE FOR A HOLDING BIN

CROSS-REFERENCE TO RELATED APPLICATIONS

This application is entitled to benefit of a right of priority under 35 USC §119 from European patent application 14167418.4, filed on May 7, 2014, the content of which is incorporated by reference as if fully recited herein.

TECHNICAL FIELD

The disclosed invention relates to a device to perform the function of emptying a holding bin that is used to hold articles sorted out by a sorting mechanism associated with a product-checking system, specifically a checkweighing scale and/or a metal detection system and/or an inspection system that is based on electromagnetic radiation.

BACKGROUND

Checkweighing scales are a key element of quality assurance in the manufacture of pharmaceuticals or cosmetics, food products and beverages, as well as in the logistics, chemical, automobile parts and metalworking industries. Checkweighing scales not only provide improved efficiency in the utilization of resources, but they also help in achieving conformance with national regulations, Weights and Measures requirements and industry standards. An effective checkweighing system provides protection against product defects and lowers overall operating costs.

A dynamic checkweighing scale is a system that measures the weights of objects in motion as they move over a scale in their path within a production line, wherein the weighed objects are classified according to specified weight brackets and are either sorted in accordance with their classification or taken out of the production line. Checkweighing scales are used in many different areas, including for example:
  checking for underweight or overweight of products,
  assuring compliance with legal requirements for the net contents of packaged goods,
  reducing product give-away by adjusting the settings of the filling machines based on the weight data collected from the checkweighing scale,
  measuring and recording the performance of the production facility or production line, and
  verifying the piece count based on weight.

With checkweighing scales, 100 percent of the articles in a production line are being weighed. Accordingly, complete production records are collected for product count, lot traceability, or production statistics.

A checkweighing system normally consists of an infeed conveyor, a weighing conveyor, an outfeed conveyor with sorting mechanism, and a weighing terminal with a user interface. The belt conveyor that lies between the infeed conveyor and the outfeed conveyor is normally mounted on a weighing cell which measures the weight of a product in motion as it travels over the weighing belt. The weighing technologies used most often for checkweighing scales are strain gauge load cells or weighing cells that function according to the principle of electromagnetic force compensation. After they have passed over the weighing conveyor, the products are transported away by an outfeed conveyor arranged downstream of the weighing conveyor. In the dynamic weighing process, products of non-conforming weight are detected and expelled by the sorting device, usually by a pusher element moving transverse to the transport direction of the products.

Next to checkweighing scales, metal detectors are likewise considered key components of an effective quality assurance program. Metal detectors are employed by industrial users for the detection of contaminants in products, for example lead pellets in meat, wire fragments in grain, splinters remaining from repair work in the production machinery, or other foreign matter that may be present in the product being processed.

An industrial metal detection system is a highly developed instrument with the ability to detect and sort out metallic foreign objects. Materials that are detectable include ferrous metals including stainless steels and non-ferrous metals such as brass, copper, aluminum and lead. A typical metal detection system consists of the following four main components: search head, transport system, user interface, and automatic sorter unit. The search head in most cases consists of a plurality of electromagnetic coils functioning, respectively, as senders and receivers of high-frequency electromagnetic fields.

An automated sorter unit has the task of segregating those products from the production stream which in a preceding product inspection have failed to meet the quality specifications set by the user. The segregation can be carried out in many different ways and also depends on the kind of product. Light-weight products such as for example edge-sealed bags can be removed from the product stream by a pulse blast from an air nozzle. In many more cases, however, the defective product is removed by a pusher unit which is operated mechanically by a pneumatic cylinder or by means of an electric motor.

The product that has been expelled from the original product stream either moves on to a further conveyor path and is thereby taken out of the product stream, or it is pushed into a holding bin directly next to the product stream. Accordingly, the holding bin is the place where all defective products of an inspection system are collected. The user of the inspection system now has the option to determine the nature of the product defects more closely by taking the respective articles out of the holding bin.

A holding bin for recyclable raw materials described in DE 3 333 316 A1 is shown with a tilting tub and a cover as a solution for improving the collection of recyclable raw materials. The tilting tub is set into the insertion guide near the bottom by means of two pivot pins that form an axis of rotation. Two pins form end stops that delimit the swivel movement of the tilting tub. This design of a container is not suitable for use as a holding bin in a sorter device, because the objects inside the container are removed through the same opening through which they entered the container. In addition, the container is not designed so that it could receive sorted-out articles at the same time as articles are taken out. In an automated production line with a sorter device, this capability is absolutely required, because otherwise the sorting would have to be interrupted.

A holding bin that is currently distributed by the applicant for installation in a sorting mechanism has an inlet opening at the height of the outfeed conveyor belt and a discharge device located closer to the ground. The discharge device is realized as a downward-tiltable flap which can take two positions: one position in which the holding container is closed and a second position in which the entire contents of the holding container can be dumped out. It has been found difficult to remove an individual sorted-out article, because when the flap is opened it swings out in the downward direction, allowing all of the articles inside to fall out.

It is therefore the object of this invention to provide a holding bin for a sorting device which is designed so that individual articles can be taken out of the bin easily, in particular by using preferably only one hand in the process.

It should further be possible that the sorting device does not need to be stopped while an article is taken out and that further articles that are to be sorted out can be moved into the holding bin at the same time.

SUMMARY

This task is solved by a design of the holding bin for a sorter device in which the sorted-out articles are collected, wherein the holding bin has an inlet opening for bringing sorted-out articles into the interior of the collecting bin, and wherein the holding bin further has a discharge device which is configured for the discharge of one or more of the sorted-out articles from the interior of the holding bin and which is normally arranged below the inlet opening. The discharge device has a flap that is pivotally supported so as to be rotatable about a rotary axis. The discharge device further has two sidewalls attached laterally to the flap.

As a distinguishing feature of the invention, the holding bin has a motion-guiding arrangement with at least one guide track and at least one pin which, in the operating state of the holding bin, is engaged in the guide track. The guide track is arranged either on a sidewall of the flap or at the lateral wall of the holding bin, while the pin is arranged in the respective complementary location on the lateral wall of the holding bin or on the sidewall of the flap.

According to a further developed embodiment of the invention, the guide track has two end positions and at least one intermediate position between the two end positions, wherein the pin is configured as a detent pin which can move into a locking engagement at the intermediate position or either of the two end positions.

By having an intermediate position, it becomes possible to leave the flap in a half-open position in order to allow sorted-out articles to be taken out individually from the holding bin. As a further advantage, this can be accomplished with only one hand.

In a further advantageous embodiment, the guide track has the shape of a circular segment, wherein the rotary axis forms the center of the circle.

According to a further embodiment of the invention, the detent pin is pushed into the guide track by the pre-tension of a spring element.

According to a further advantageous embodiment of the invention, the guide track is configured as a groove, and each of the detent stops of the guide track is configured as a recess in the groove.

In a preferred embodiment of the invention, the guide track is configured as a slot that cuts through the thickness of the sidewall, and the detent positions of the guide track are configured as passage holes whose diameter is larger than the width of the slot.

In a further preferred embodiment, the rotary axis can be moved in a linear displacement at a right angle to itself. The guide track is composed of a first and a second circular segment which are connected to each other and have different radii, wherein the rotary axis represents the center of the first circular segment and the second circular segment, and wherein the pin is configured as a guide pin.

It is an advantage of this embodiment that the amount of wear on the pin is minimized. This also reduces the amount of noise associated with moving the flap.

According to a further development of an embodiment of the invention, the guide track is configured as a slot that passes through the thickness of the sidewall of the flap or through the thickness of the lateral wall of the holding bin.

In a further developed embodiment of the invention, the rotary axis can be moved linearly at a right angle to itself by 10 to 15 mm, while at the same time the guide pin shifts its position on the guide track from the first circular segment to the second circular segment.

In a further developed advantageous embodiment of the invention, the rotary axis is configured as a hinge, wherein one half of the hinge is solidly connected to the flap and the other half of the hinge is connected to the holding bin by way of two elongated holes which allow linear movement of the hinge in the direction of the elongated holes.

In an advantageous configuration, the angle between the end position in which the discharge device is closed and the at least one intermediate position is 40 to 70 degrees.

In a further advantageous configuration, the angle between the at least one intermediate position and the end position in which the discharge device is open is 60 to 90 degrees.

In a further configuration, the entire guide track extends over an angle between 100 and 160 degrees.

An inspection system that includes in particular a check-weighing scale and/or a metal detection unit and/or an inspection apparatus based on electromagnetic radiation is equipped with one or more holding bins according to the invention.

BRIEF DESCRIPTION OF THE DRAWINGS

Details of the holding bin according to the invention will be apparent from the description of the embodiments that are illustrated in the drawings, wherein

FIG. 9 represents a third embodiment of the holding bin according to the invention in a perspective view;

FIG. 10 represents a side elevation of the third embodiment of a holding bin according to the invention seen in the direction B and showing the discharge device in the closed position;

FIG. 11 represents a side elevation of the third embodiment of a holding bin according to the invention seen in the direction B and showing the discharge device opened to an intermediate position where the sorted-out articles can be taken out individually; and FIG. 12 represents a side elevation of the third embodiment of a holding bin according to the invention seen in the direction B and showing the discharge device in the fully opened position.

DETAILED DESCRIPTION OF THE DRAWINGS

Figure 1:
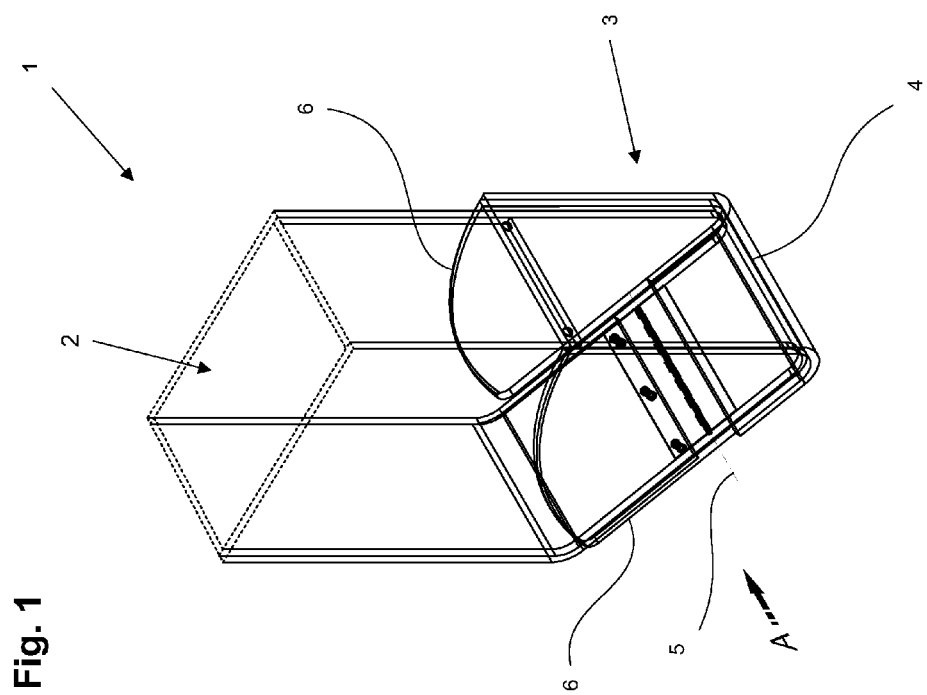
FIG. 1 represents a holding bin of the state of the art in an isometric view.

FIG. 1 shows a holding bin 1 for a state-of-the-art sorting system with an inlet opening 2 and a discharge device 3. The sorted-out articles are moved into the interior of the holding bin 1, where they are stored until they are taken out by the user of the sorting system. The discharge device 3 has a flap 4 which is pivotally supported by a hinge forming the rotary axis 5 and which can be tilted downwards in order to release the contents of the holding bin 1. Two sidewalls 6 of the flap 4 serve to close off the flanks in order to safely guide the dumping of the contents of the holding bin 1. The sidewalls 6 of the flap 4 could also lie to the inside of the holding bin walls, but in this case a deflector element will be needed above the sidewalls 6 of the flap 4 to ensure that the sorted-out articles fall to the bottom of the flap 4 and cannot jam the discharge device 3.

Figure 2:
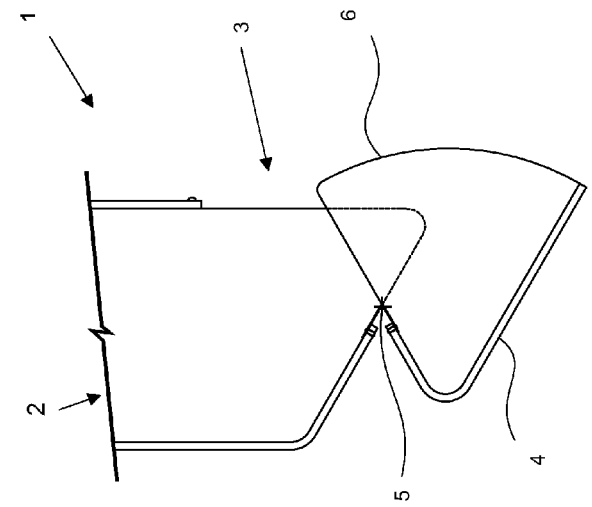
FIG. 2 represents a holding bin of the state of the art in a side elevation seen in the direction A of FIG. 1, showing the discharge device of a state-of-the-art collecting bin in the closed position.

FIG. 2 shows the side view of the holding bin 1 in the viewing direction indicated by the arrow A in FIG. 1. The discharge device 3 of the holding bin 1 is shown in the closed position. The rotary axis 5 in FIG. 2 is oriented perpendicular to the plane of the drawing and is indicated by a crosshair symbol. One side of the hinge is riveted to the holding bin 1 and the other side to the flap 4. Not shown in FIG. 2 is a locking mechanism which secures the flap 4 in the closed position and prevents the flap 4 from accidentally swinging out. Such a locking mechanism could be configured as a simple turning or sliding knob connected to a locking latch, or also as a rotary or sliding lock which additionally prevents unauthorized access to the sorted-out articles.

Figure 3:
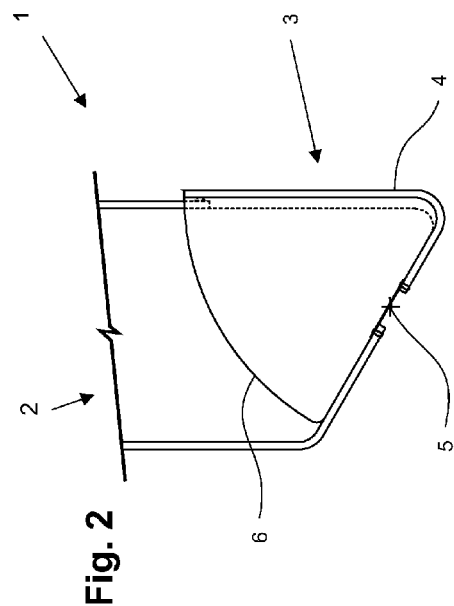
FIG. 3 represents a holding bin of the state of the art in a side elevation seen in the direction A of FIG. 1, showing the discharge device of a state-of-the-art collecting bin in the open position.

In FIG. 3, the discharge device 3 of the state-of-the-art holding bin 1 is shown in the open position. The flap 4 is tilted downward on its rotary axis and releases the contents of the holding bin 1 for dumping. As the flap freely swings down into the open position, it is difficult to take out individual articles.

Figure 4:
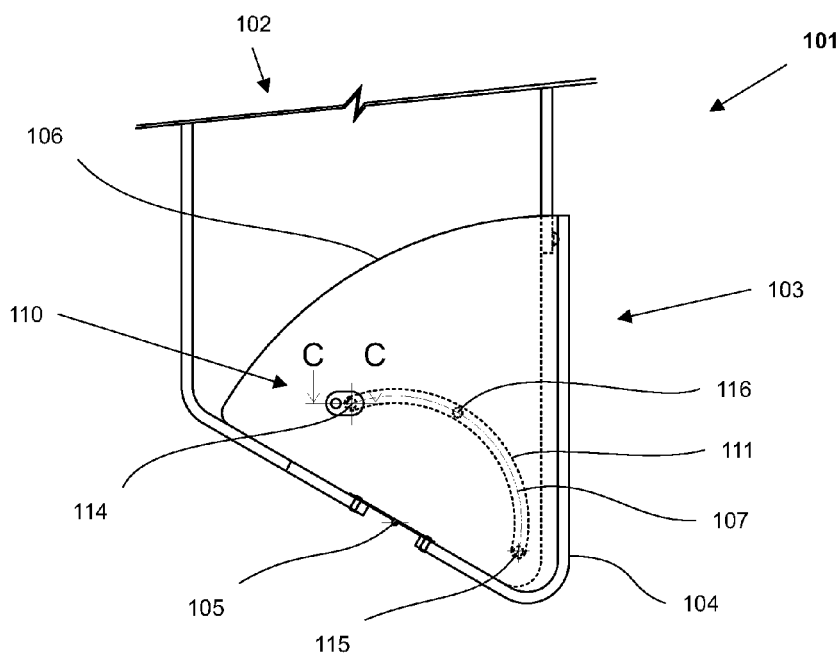
FIG. 4 represents a side elevation of a first embodiment of a holding bin according to the invention.

FIG. 4 illustrates a first embodiment of a holding bin 101 according to the invention. A guide track 107, which is part of a motion-guiding arrangement 110 and is indicated in FIG. 4 (as well as in FIGS. 7, 10, 11, 12) by a dash-dotted line, is recessed as a circular groove segment 111 into the side of the holding bin 101 that faces the viewer. The center of the circle that describes the groove segment 111 coincides with the rotary axis 105. An identical groove segment 111 can also be present on the opposite side of the holding bin 101. A detent pin 108 that is seated in a hole in the sidewall 106 (see FIGS. 5 and 6) reaches into the groove 111 and guides the flap along the guide track 107. The detent pin 108 is held in place here by a leaf spring element 117 in the form of tongue, but could also be secured in other ways that are not described here. Along the guide track 107, two end positions 114, 115 and an intermediate position 116 are configured as indentations in the bottom of the groove 111.

Figure 5:
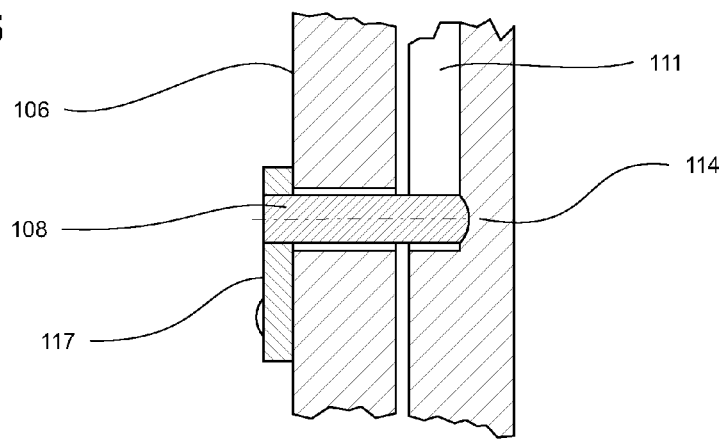
FIG. 5 shows the detent mechanism of a first embodiment of a holding bin according to the invention with the view directed along the line C-C of FIG. 4.

FIG. 5 shows an enlarged detail of FIG. 4 in cross-section with the view directed along the line C-C. The detent pin 108 runs through a passage hole in the sidewall 106 and reaches into the groove 111 where it is seated in the indentation at the bottom of the groove 111. This also represents the end position 114 for the closed position of the discharge device 103. When the flap 104 is swivelled downward in order to open the discharge device 103, the detent pin 108 is pushed out of the indentation in the bottom of the groove 111, elastically bending the tongue which acts as a spring element 117, whereupon the flap 104 is guided by the pin 108 along the guide track 107 (not shown in the drawing).

Figure 6:
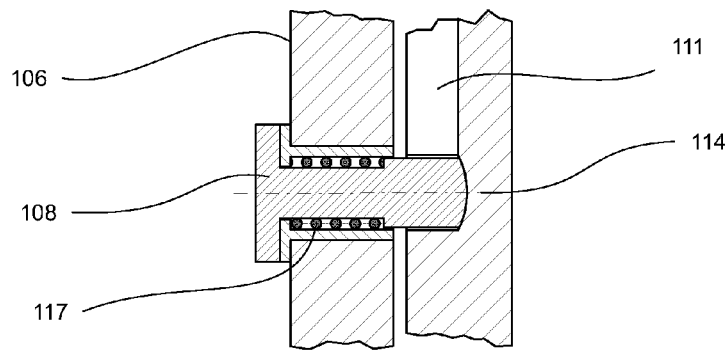
FIG. 6 shows a further possible embodiment of the detent mechanism for a first embodiment of a holding bin according to the invention.

FIG. 6 illustrates another possible configuration of the detent mechanism of FIG. 5. The detent pin 108 is in this case pushed to the bottom of the groove 111 by a helix spring acting as the spring element 117.

Figure 7:
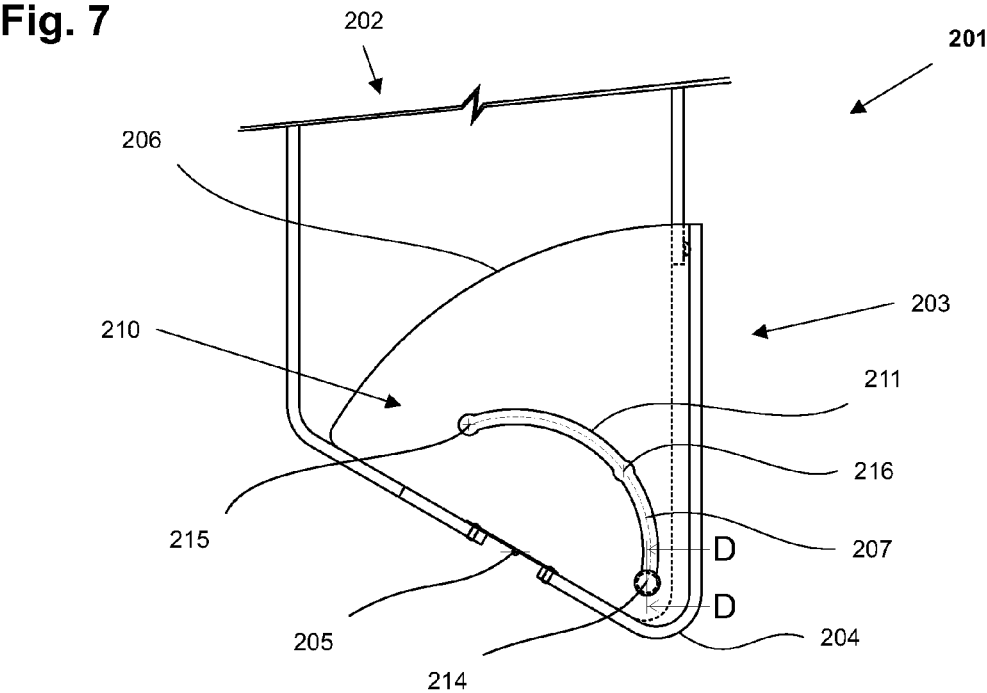
FIG. 7 represents a side elevation of a second embodiment of a holding bin according to the invention.

FIG. 7 shows a second possible embodiment of the holding bin 201 according to the invention. The guide track 207 is configured as a slot 211 that cuts through the thickness of the sidewall 206 of the flap 204. The detent pin 208, which is arranged at a fixed location of the sidewall of the holding bin 201, secures the flap 204 in the end position 214, i.e. the closed position of the discharge device 203.

Figure 8:
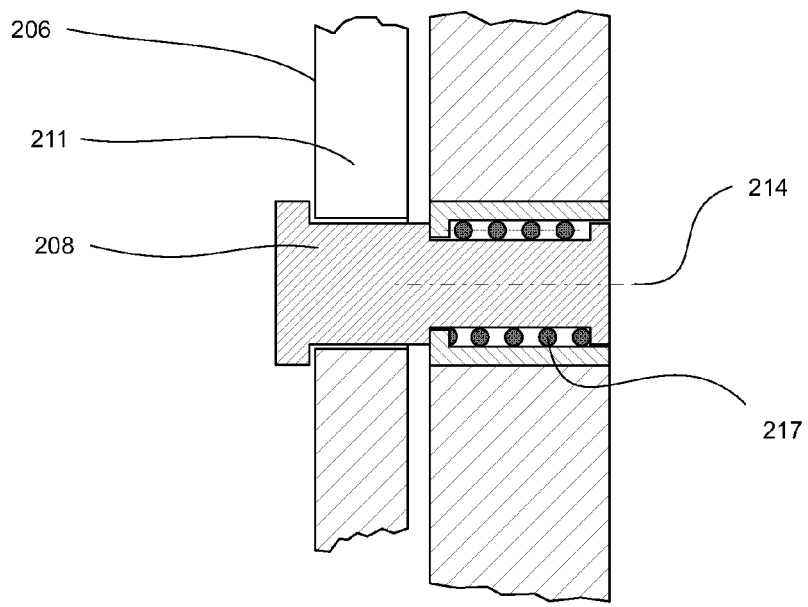
FIG. 8 shows the detent mechanism of the second embodiment of a holding bin according to the invention with the view directed along the line D-D of FIG. 7.

In an enlarged detail view, FIG. 8 shows the detent mechanism of the second embodiment which is illustrated in FIG. 7. The flap 204 is held in the end position 215 by the form-fitting engagement of the large-diameter head portion of the detent pin 208 in a passage hole which has a larger diameter than the width of the slot 211. By pulling the detent pin 208 out of the hole (i.e. towards the left in the view of FIG. 8), the locking engagement is released. The spring element 217, shown here as a helix spring, is thereby being compressed and pre-tensioned. The narrower shaft portion of the detent pin 208 is dimensioned so that the detent pin 208 can be moved freely along the groove 211.

A third embodiment of a holding bin 301 according to the invention is shown in an isometric view in FIG. 9. The hinge 318 connects the flap 304 to the holding bin 301 and simultaneously forms the rotary axis 305. One half of the hinge 318 is solidly connected to the flap 304, while the other half of the hinge is connected to the holding bin 301 by way of two elongated holes 312 which allow linear movement of the hinge in the direction of the elongated holes.

FIG. 10 represents a side elevation of the third embodiment of a holding bin 301 according to the invention, seen in the direction B (see FIG. 9) and showing the discharge device 303 in the closed position. The guide track 307 which is formed in at least one of the sidewalls 306 of the flap 304 is divided into a first circular segment 309' and a second circular segment 309". The circular segments 309' and 309" have different radii, but their circles have the same center point which simultaneously forms the rotary axis 305. The guide track 307 is configured as a slot 311 cutting through the thickness of the sidewall 306 of the flap 304, with a short step connecting the two segments which are offset against each other.

FIG. 11 represents a side elevation of the third embodiment of a holding bin 301 according to the invention, seen in the direction B (see FIG. 9) and showing the discharge device 303 opened to an intermediate position where the sorted-out articles can be taken out individually. The detent pin 308 is now at the intermediate position 316. Due to the step d which exists as a result of the division of the guide track 307 into two segments, the slot 311 has a shoulder that holds the flap 304 in its position. This intermediate position 316 makes it easy to take one or more of the sorted-out articles out of the discharge device 303.

To bring the discharge device 303 into the completely open position, as shown in FIG. 12, the elongated holes 312 of the hinge 318 (see FIG. 9) allow the flap 304 with the sidewalls 306 to be moved by the amount d of the offset, whereby the rotary axis 305 is shifted so that the guide pin 308 enters the second circular segment 309" of the guide track 307. The flap 304 can now be tilted further about the rotary axis 305 until the end position 315 is attained.

To allow the flap 304 to be secured in additional positions, the guide track 107, 207 could be configured with additional intermediate positions. In the case of the first embodiment, one would have to provide additional indentations in the bottom of the groove 111. In the case of the second embodiment, additional passage holes would be necessary. For the third embodiment, more circular segments would have to be added to the guide track 307.

In all of the embodiments of the holding bin 101, 201, 301 of the invention as described herein the sidewalls 106, 206, 306 are arranged on the outside of the holding bin 101, 201, 301. However, each of these embodiments can also be configured with sidewalls 106, 206, 306 arranged inside the walls of the holding bin 101, 201, 301. This can be accomplished simply through a kinematically reverse configuration of the functional elements of the motion-guiding arrangement 110, 210, 310.

While the invention has been described through the presentation of several specific embodiments, it is considered self-evident that numerous additional variants could be developed based on the teachings of the present invention, for example by combining the features of the individual embodiments with each other and/or by exchanging individual functional units of the embodiments against each other.

What is claimed is:

1. A bin, for use in association with a device that sorts out articles, to collect and hold the sorted-out articles, the bin comprising:
    an inlet opening for delivering the sorted-out articles into an interior thereof;
    a discharge device for discharging one or more of the sorted-out articles from the interior, the discharge device comprising a flap, supported pivotally for rotation about a rotary axis, and two sidewalls that are attached laterally to the flap; and
    a motion-guiding arrangement, comprising:
        a guide track, having a first and a second end position with at least one intermediate position therebetween, the guide track arranged either on a side of the bin or on one of the sidewalls of the flap; and
        a pin arranged complementarily to the guide track on one of the sidewalls of the flap or on the side of the bin so that the pin and the guide track are engaged in an operating state of the bin with the pin acting as a detent pin for a locking engagement with the guide track at any of the intermediate positions and at either of the end positions.

2. The bin of claim 1, further comprising:
    a spring element, providing pre-tension to push the detent pin into the guide track.

3. The bin of claim 1, wherein:
    the guide track is configured as a slot that cuts through a thickness of the one of the sidewalls or the side of the bin or is configured as a groove in one of the sidewalls or at the side of the bin.

4. The bin of claim 3, wherein:
    the rotary axis is configured as a hinge, a first half of which is solidly connected to the flap and the other half of which is connected to the bin by way of at least two elongated holes that allow linear movement of the hinge in the direction of the elongated holes.

5. The bin of claim 1, wherein:
    the device, associated with the bin, that sorts out articles is at least one of: a checkweighing scale, a metal detection unit and an inspection apparatus based on electromagnetic radiation.

6. A bin, for use in association with a device that sorts out articles, to collect and hold the sorted-out articles, the bin comprising:
    an inlet opening for delivering the sorted-out articles into an interior thereof;
    a discharge device for discharging one or more of the sorted-out articles from the interior, the discharge device comprising a flap, supported pivotally for rotation about a rotary axis, and two sidewalls that are attached laterally to the flap; and
    a motion-guiding arrangement, comprising:
        a guide track, having a first and a second end position with at least one intermediate position therebetween, the guide track arranged either on a side of the bin or on one of the sidewalls of the flap, wherein each of the end positions and the intermediate positions is configured as a passage hole that is larger than a width of the guide track; and
        a pin arranged complementarily to the guide track on one of the sidewalls of the flap or on the side of the bin, so that the pin and the guide track are engaged in an operating state of the bin.

7. The bin of claim 6, wherein:
    the guide track is configured as a slot that cuts through a thickness of the one of the sidewalls or the side of the bin or is configured as a groove in one of the sidewalls or at the side of the bin.

8. The bin of claim 7, wherein:
    the rotary axis is configured as a hinge, a first half of which is solidly connected to the flap and the other half of which is connected to the bin by way of at least two elongated holes that allow linear movement of the hinge in the direction of the elongated holes.

9. The bin of claim 6, wherein:
    the device, associated with the bin, that sorts out articles is at least one of: a checkweighing scale, a metal detection unit and an inspection apparatus based on electromagnetic radiation.

10. A bin, for use in association with a device that sorts out articles, to collect and hold the sorted-out articles, the bin comprising:
    an inlet opening for delivering the sorted-out articles into an interior thereof;
    a discharge device for discharging one or more of the sorted-out articles from the interior, the discharge device comprising a flap, supported pivotally for rotation about a rotary axis, and two sidewalls that are attached laterally to the flap; and
    a motion-guiding arrangement, comprising:
        a guide track, composed of a segment of a first circle and a segment of a second circle, where the respective circle segments are connected and have different radii, with the rotary axis located at a center of each of the circle segments and is arranged for translatory displacement at a right angle to itself, with the guide track arranged either on a side of the bin or on one of the sidewalls of the flap; and
        a pin, configured as a guide pin, arranged complementarily to the guide track on one of the sidewalls of the flap or on the side of the bin so that the pin and the guide track are engaged in an operating state of the bin.

11. The bin of claim 10, wherein:
a translatory displacement of the rotary axis at a right angle to itself in the range of 10 to 15 mm moves the guide pin on the guide track from the first circular segment to the second circular segment.

12. The bin of claim 10, wherein:
the rotary axis is configured as a hinge, a first half of which is solidly connected to the flap and the other half of which is connected to the bin by way of at least two elongated holes that allow linear movement of the hinge in the direction of the elongated holes.

13. The bin of claim 10, wherein:
the pin traverses an angle of between 40 to 70 degrees in moving from the end position in which the discharge device is in a closed condition to a position where the pin occupies the at least one intermediate position.

14. The bin of claim 10, wherein:
the pin traverses an angle of between 60 to 90 degrees in moving from the end position in which the discharge device is in a closed condition to the other end position, in which the discharge device is in a fully-opened condition.

15. The bin of claim 10, wherein:
the guide track is configured as a slot that cuts through a thickness of the one of the sidewalls or the side of the bin or is configured as a groove in one of the sidewalls or at the side of the bin.

16. The bin of claim 15, wherein:
the rotary axis is configured as a hinge, a first half of which is solidly connected to the flap and the other half of which is connected to the bin by way of at least two elongated holes that allow linear movement of the hinge in the direction of the elongated holes.

17. The bin of claim 10, wherein:
the device, associated with the bin, that sorts out articles is at least one of: a checkweighing scale, a metal detection unit and an inspection apparatus based on electromagnetic radiation.

* * * * *